United States Patent
Bradley

(10) Patent No.: US 9,995,884 B2
(45) Date of Patent: Jun. 12, 2018

(54) SYSTEMS AND TECHNIQUES FOR IMPROVING INSERTION LOSS PERFORMANCE OF MULTICORE FIBER CONNECTORS

(71) Applicant: OFS Fitel, LLC, Norcross, GA (US)

(72) Inventor: Kelvin B Bradley, Lawrenceville, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days. days.

(21) Appl. No.: 15/152,275

(22) Filed: May 11, 2016

(65) Prior Publication Data

US 2016/0252684 A1    Sep. 1, 2016

Related U.S. Application Data

(60) Division of application No. 13/938,458, filed on Jul. 10, 2013, now Pat. No. 9,366,828, which is a continuation-in-part of application No. 13/049,780, filed on Mar. 16, 2011, now Pat. No. 8,801,301, and a continuation-in-part of application No. 13/049,794, filed on Mar. 16, 2011, now Pat. No. 9,069,143.

(60) Provisional application No. 61/675,167, filed on Jul. 24, 2012, provisional application No. 61/314,165, filed on Mar. 16, 2010.

(51) Int. Cl.
*G02B 6/38* (2006.01)
*G02B 6/02* (2006.01)
*G02B 6/245* (2006.01)

(52) U.S. Cl.
CPC ....... *G02B 6/3885* (2013.01); *G02B 6/02042* (2013.01); *G02B 6/245* (2013.01); *G02B 6/3843* (2013.01); *G02B 6/3851* (2013.01); *G02B 6/3861* (2013.01); *G02B 6/3863* (2013.01); *G02B 6/3893* (2013.01)

(58) Field of Classification Search
None
See application file for complete search history.

(56) References Cited

U.S. PATENT DOCUMENTS 9,690,053 B2 *   6/2017   Bradley ............... G02B 6/3834

\* cited by examiner

*Primary Examiner* — Mike Stahl
(74) *Attorney, Agent, or Firm* — Jacobs & Kim LLP

(57) ABSTRACT

Structures and techniques are described for aligning multicore optical fibers in a multicore optical fiber cable having a plurality of optical fiber cores, at least one end portion and a protective coating. The protective coating is removed from the end portion of the multicore fiber cable to create an exposed end portion of the multicore fiber. The exposed end portion of the multicore fiber is inserted into a guide hole defined longitudinally through a ferrule subassembly. The cores of the fiber are aligned rotationally, in a predetermined orientation, relative to the ferrule. Each fiber is biased within its respective guide hole in a predetermined orientation relative to the ferrule. The multicore fiber is bonded within the ferrule. The fiber is trimmed at the ferrule tip and the ferrule and fiber end faces are polished, so that a selected alignment of the multicore fiber is achieved.

12 Claims, 10 Drawing Sheets

SYSTEMS AND TECHNIQUES FOR IMPROVING INSERTION LOSS PERFORMANCE OF MULTICORE FIBER CONNECTORS

CROSS REFERENCE TO RELATED APPLICATIONS

The present application is a divisional of co-pending U.S. patent application Ser. No. 13/938,458, filed on Jul. 10, 2013, which claims the priority benefit of U.S. Provisional Patent Application Ser. No. 61/675,167, filed on Jul. 24, 2012.

U.S. patent application Ser. No. 13/938,458 is a continuation-in-part of the following patent applications:
"Simplex Connectors for Multicore Optical Fiber Cables," U.S. patent application Ser. No. 13/049,780, filed on Mar. 16, 2011, which issued as U.S. Pat. No. 8,801,301 on Aug. 12, 2014; and
"Multifiber Connectors for Multicore Optical Fiber Cables," U.S. patent application Ser. No. 13/049,794, filed on Mar. 16, 2011, which issued as U.S. Pat. No. 9,069,143 on Jun. 30, 2015,
both of which claim the priority benefit of U.S. Provisional Patent Application Ser. No. 61/314,165, filed on Mar. 16, 2010.

All of the above applications are owned by the assignee of the present application, and are incorporated herein by reference in their entirety.

INCORPORATION BY REFERENCE

The following patent applications, both owned by the assignee of the present invention, are incorporated herein by reference in their entirety:
"Multicore Fibers and Associated Structures and Techniques," U.S. patent application Ser. No. 13/045,064, filed on Mar. 10, 2011, published on Nov. 10, 2011, as United States Patent Application Publication No. 2011/0274398; and
"Multicore Fiber Transmission Systems and Methods," U.S. patent application Ser. No. 13/044,859, filed on Mar. 10, 2011, published on Nov. 10, 2011, as United States Patent Application Publication No. 2011/0274435.

BACKGROUND OF THE INVENTION

Field of the Invention

The present invention relates generally to the field of fiber optics, and in particular to connectors and connection techniques for multicore optical fibers.

Background Art

A multicore fiber (MCF) is an optical fiber in which a plurality of cores extend through a common cladding. MCF technology has the potential of greatly increasing the capacity of current optical fiber networks by allowing a plurality of optical data signals to be carried in parallel by a single fiber. One important technical issue to be addressed is connectorization, i.e., how to suitably terminate MCF cables with mating connectors that can be easily joined together with acceptably low insertion loss. It will be apparent that an important component in minimizing insertion loss is to connectorize MCF cables such that when a first mating connector and a second mating connector are joined together, the MCF cores at the first connector are properly aligned with respective MCF cores at the second connector, so as to preserve each of the parallel data transmission channels.

Techniques have been developed for terminating single-mode and multimode MCFs using standard simplex and multifiber connectors (i.e., connectors developed for use with single-core fibers). However, one drawback of prior art connectors of this type is their general inability to address the issue of insertion losses resulting from transverse displacements, or "offsets," of one or more MCF cores at the first connector relative to the respective MCF cores at the second connector. Current limitations on the dimensional control of various features of MCFs, such as outside diameter, core position, and the like, result in optical insertion losses that are significantly higher than those typically achievable with comparable single-core fibers, given equivalent dimensional control of the alignment components, such as ferrules, alignment pins, and the like.

Transverse core offsets between opposing MCF cores in mated connectors can result, for example, if one or more of MCF cores are not in their ideal positions relative to the adjacent MCF cores, or if the clearance variations between the fiber outer diameter and the ferrule inner diameter are too large. In such cases, standard connector termination procedures cannot be used to minimize the offsets.

The issue of transverse core offsets also arises when using mated connectors in conjunction with "twisted" MCFs, i.e., an MCF in which the cores propagate helically around the fiber axis. When twisted MCFs are utilized, standard fiber termination and polishing procedures can cause excessive rotational misalignment of the cores. As material is polished away from the connector ferrule, the cores migrate away from their initial position. This is especially problematic in the case of angled physical contact (APC) connectors. Typically, a twisted MCF would be rotationally aligned and fixed relative to the housing prior to being angle polished. Angle polishing requires a relatively significant amount of material to be removed from the fiber and ferrule endface.

Twisted multicore fibers are typically used in shape-sensing applications (for medical procedures, bore-hole drilling, etc.), which employ optical backscatter reflectometers (OBR). The back-reflection performance of each connector can greatly affect shape-sensing system performance. Therefore, APC connectors, which provide a 65 dB minimum RL, versus the 50 dB RL provided by PC connectors, are typically specified. Thus, APC connector termination and polishing must be performed in a way that avoids excessive core misalignment, since the misalignment would result in large transverse offsets and high, inconsistent insertion-loss performance.

SUMMARY OF THE INVENTION

An aspect of the invention is directed to structures and techniques for aligning multicore optical fibers in a multicore optical fiber cable having a plurality of optical fiber cores, at least one end portion and a protective coating. The protective coating is removed from the end portion of the multicore fiber cable to create an exposed end portion of the multicore fiber. The exposed end portion of the multicore fiber is inserted into a guide hole defined longitudinally through a ferrule subassembly. The cores of the fiber are aligned rotationally, in a predetermined orientation, relative to the ferrule. Each fiber is biased within its respective guide hole in a predetermined orientation relative to the ferrule. The multicore fiber is bonded within the ferrule. The fiber is trimmed at the ferrule tip and the fiber and ferrule end faces are polished, so that a selected alignment of the multicore fiber is achieved.

A further aspect of the invention is directed to a technique for providing an aligned angled-physical contact (APC) connectorization for an optical cable containing a twisted core multicore optical fiber, the twisted core multicore optical fiber having a plurality of optical fiber cores arrayed substantially in a helical pattern. An end portion of the multicore optical cable is stripped to create an exposed, bare end of the multicore fiber. The exposed end portion of the multicore fiber is inserted into a capillary extending longitudinally through a ferrule subassembly of an optical connector. The exposed end of the multicore fiber is bonded within the ferrule. The fiber is trimmed at the ferrule tip. The trimmed fiber is polished. The ferrule subassembly is rotated around its longitudinal axis within the optical connector until the fiber cores have a selected pre-polish angular offset relative to a selected post-polish rotational alignment. The ferrule is polished to a desired endface angle, such that the fiber cores have the selected post-polish rotational alignment.

DETAILED DESCRIPTION

The present invention is directed to techniques and fixtures for terminating multicore fibers (MCFs) so as to minimize transverse core offsets in mated connectors.

A first aspect of the invention is directed towards the reduction of insertion losses potentially resulting from an overly large mismatch between the outer diameter of an MCF and the inner diameter of a ferrule capillary into which the MCF is loaded.

A second aspect of the invention is directed towards the reduction of insertion losses potentially resulting from rotational migration of the cores of a twisted MCF during the termination process.

Each aspect of the invention is described in turn.

Reduction of Loss Resulting from Mismatch Between MCF OD and Ferrule ID

A first aspect of the invention is directed to a technique for terminating an MCF, wherein the MCF is biased to a selected side of the capillary before the position of the MCF within the capillary is permanently fixed. Suitable biasing of the MCF minimizes core transverse offsets (or positional errors), particularly those caused by a mismatch between the fiber outer diameter and the inner diameter of the ferrule guide hole. The described minimization reduces insertion losses between the respective cores of MCFs mounted into mating connectors.

Figure 1:
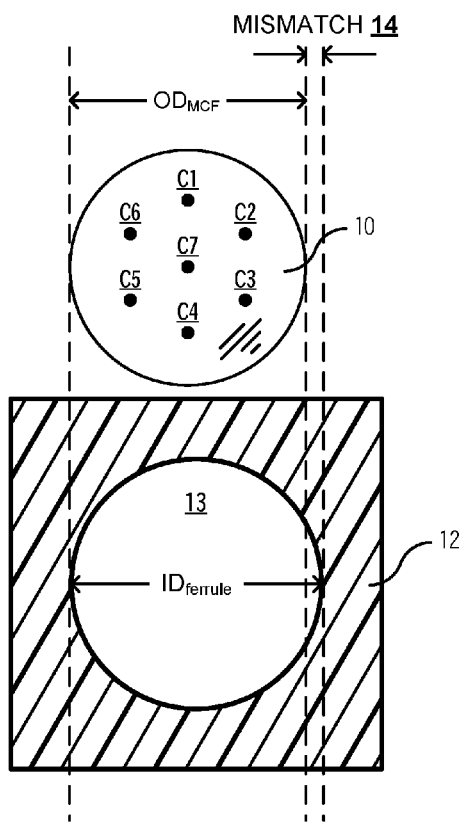
FIG. 1 shows a diagram of an exemplary MCF and a portion of a ferrule into which the MCF is to be installed.

FIG. 1 shows a diagram of an exemplary MCF 10 and a portion of a ferrule 15 into which the MCF 10 is to be installed. Both MCF 10 and ferrule 15 are shown in end views.

MCF 10 comprises seven individual cores C1-C7, comprising six outer cores C1-C6 arranged at the vertices of a hexagon and one core C7 at the center of the hexagon. For the purposes of the present discussion, cores C1-C6 are numbered in clockwise order, with core C1 located at the 12 o'clock position. It will be appreciated that the depicted core arrangement is provided as an example, and that the described invention can be practiced with other MCFs having a different number of cores and/or core configurations.

The depicted ferrule portion 12 represents a portion of any of various ferrules that can be used to terminate an MCF, include single-fiber and multi-fiber ferrules of various shapes and sizes. Ferrule portion 12 includes a capillary (or guide hole) 121 that is dimensioned to closely receive MCF 10, after MCF 10 has been stripped and cleaned in preparation for termination.

Figure 2A:
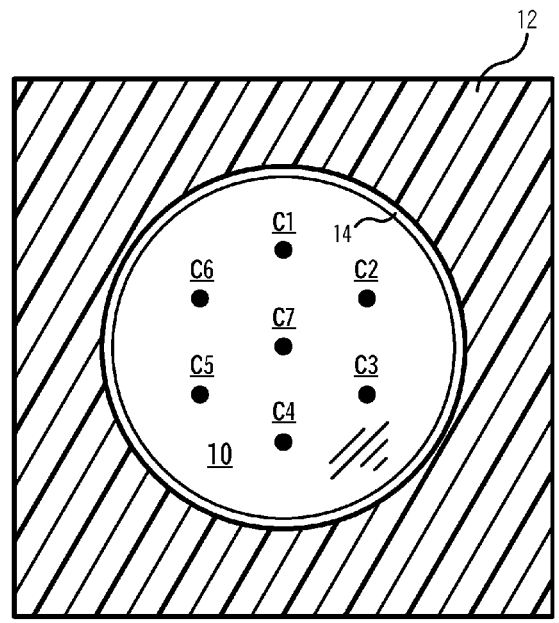
FIG. 2A shows a diagram of the MCF and ferrule portion shown in FIG. 1 after the MCF has been loaded into ferrule capillary.

FIG. 2A shows a diagram of MCF 10 and ferrule portion 12, after MCF 10 has been loaded into ferrule capillary 121.

As illustrated in FIG. 1, even when MCF 10 and ferrule 15 are both manufactured in accordance with their specifications, there can still be a significant mismatch 14 between the MCF outer diameter $OD_{MCF}$ and the ferrule capillary inner diameter $ID_{ferrule}$. (For the purposes of illustration, the size of mismatch 14 has been enlarged.) Manufacturing variations may increase the size of the mismatch 14.

For example, in one MCF design, the outer diameter specification for one single-mode MCF is 125.0 µm±1.0 µm. A standard single-mode ferrule capillary has an inner diameter specification of 126.0 µm+1.0/−0 µm. Therefore, the worst-case fiber/ferrule mismatch is 3 µm, which represents a potential 1.5 µm contribution to the positional errors of the cores within each connector. In the worst-case scenario, the transverse offset contribution, between cores in mated connectors, caused by that positional error could be as large as 3 µm. This amount of transverse offset cannot be tolerated if consistently low insertion loss performance is desired, especially for single-mode MCF applications, in which the mode-field radius of each fiber core is only approximately 3 µm.

Figure 2B:
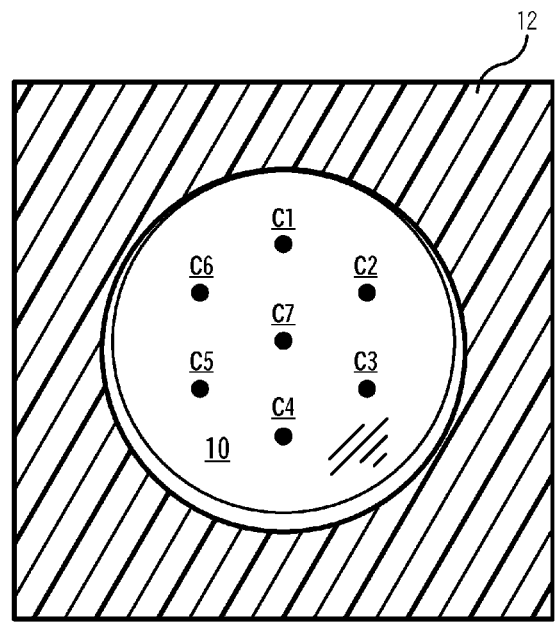
FIG. 2B is a diagram illustrating the biasing of the MCF shown in FIG. 2A against the top side of the ferrule capillary.

According to an aspect of the invention, MCF 10 is biased against a selected side of the ferrule capillary 121. FIG. 2B is a diagram illustrating the biasing of MCF against the top side of the capillary. In the depicted example, MCF 10 is rotationally aligned such that cores C1 and C4 are located at 12 o'clock and 6 o'clock, respectively. This bias is maintained as the MCF is fixed into its final position. For example, if epoxy is used, each MCF is biased prior to the final curing of the epoxy. By biasing both MCFs in a mated pair in the same way, the positional error resulting from $OD_{MCF}$-to-$ID_{ferrule}$ mismatch is minimized.

According to a further aspect of the invention, the described technique is used in conjunction with a continuously tunable connector, such as the connector described in U.S. Pat. Pub. No. 2011/0229085A1, which is owned by the assignee of the present invention, and which is incorporated by referenced herein in its entirety. Once the MCF has been biased, cured, and polished, rotational alignment may be further optimized by visually aligning the MCF cores in a desired rotational orientation relative to the housing. For multifiber connectors, the individual fibers can first be individually oriented so as to minimize rotational misalignment. The fibers can then be biased prior to the fixing of the position of each MCF within its respective capillary.

A further aspect of the invention is directed to specially designed fixtures for biasing fibers to a selected side of their respective ferrule capillaries during the curing stage of a termination procedure. Fixtures are described for use in conjunction with simplex connectors (i.e., connectors designed to terminate a single MCF), and multifiber connectors (i.e., connectors designed to terminate a plurality of MCFs).

According to a practice of the invention, for each MCF to be biased, the MCF and some epoxy are installed into a respective ferrule capillary, with a length of the bare MCF extending from the tip of the ferrule. In each of the described curing fixtures, the length of MCF extending from the ferrule tip is brought into contact with a biasing element that is configured to urge the fiber contained within the ferrule capillary towards a selected side of the capillary. The fixture and connector are then placed in a curing oven. The curing of the epoxy then fixes the position of each MCF within its respective capillary.

Fixture for Use with MT-Based (Multifiber) Connectors

Figure 3:
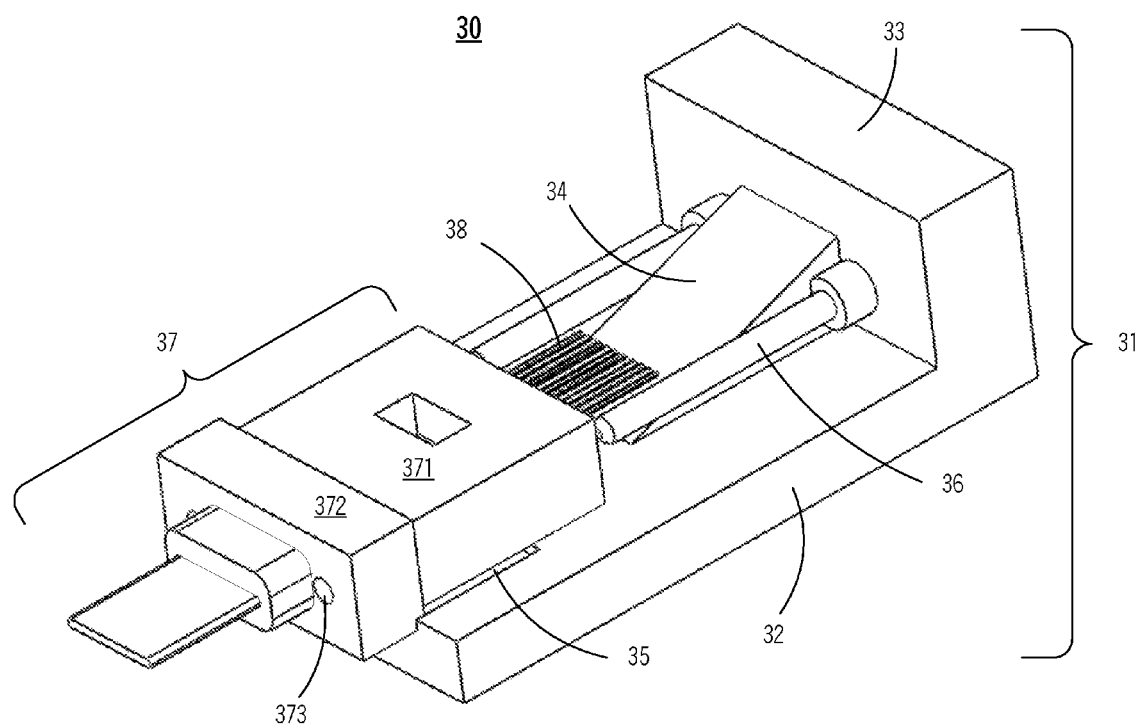
FIG. 3 shows an exemplary fiber-biasing curing fixture for use with MT-based connectors.

FIG. 3 shows an exemplary fiber-biasing curing fixture 30 for use with MT-based (multifiber) connectors. The fixture is described in detail in U.S. patent application Ser. No. 13/049,794, filed on Mar. 16, 2011, published on Sep. 22, 2011, as United States Application Publication No. 2011/0229086, of which the present application is a continuation-in-part, and which is incorporated herein by reference in its entirety. In that patent application, the fixture is used to provide rotational alignment for MCFs having a flat side indicative of the rotational orientation of the MCF cores.

Fixture 30 comprises an L-shaped chassis 31 having a base 32, an upright 33, and a ramp 34. The upper surface of base 32 includes a cutout 35 therein. A pair of MT alignment pins 36 extends from the upright 33, substantially parallel with the upper surface of base 32. Ramp 34 is positioned between the pair of MT alignment pins 36, and provides a smooth transition from a lower front elevation to a higher rear elevation.

Ferrule 37 comprises a plurality of capillaries into which fibers 38 and epoxy are installed, with the fiber ends extending out of the ferrule head 371. The ferrule is loaded into alignment fixture 30 by positioning the ferrule 37 such that front bottom edge of the ferrule head 371 abuts the upper surface of base 32, such that the front bottom edge of ferrule base 372 abuts the front portion of cutout 35, such that the ferrule alignment holes 373 are aligned with alignment pins 36, and such that the exposed ends of the bare fiber 38 abut, or are proximate to, the upper surface of ramp 34.

The ferrule 30 is then advanced towards fixture upright 33. The respective shapes of the cutout 35 and the ferrule base 372, and the close fit therebetween, causes the ferrule to be guided along a substantially straight line, whereby alignment pins 36 become seated in ferrule alignment holes 373. The movement of the ferrule 37 causes the fiber ends 38 to be urged against the ramp surface 34, thereby causing the fiber ends 38 to be urged in the direction of the desired bias.

After the ferrule 37 has reached its final position within fixture 30, and all of the fibers 38 are suitably biased, the ferrule 37 and fixture 30 are loaded into a curing oven.

Fixture for Use with SC-Based (Simplex) Connectors

Figure 4A:
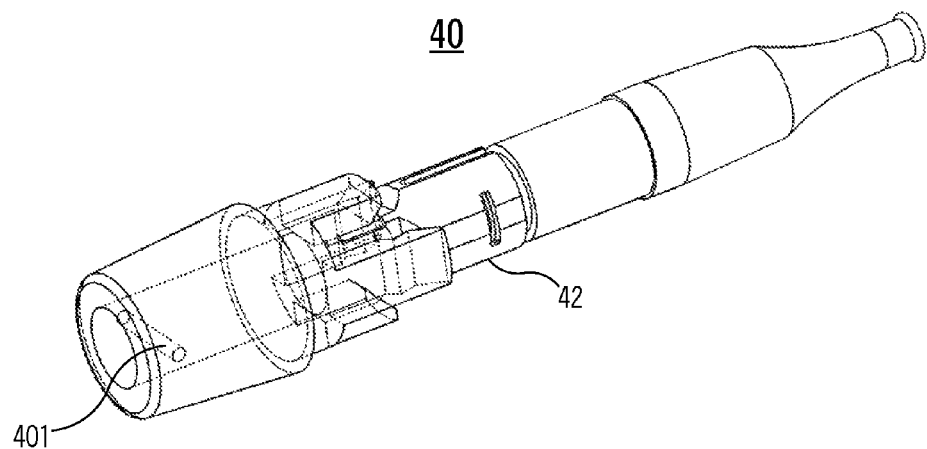
FIGS. 4A and 4B show, respectively, perspective and cross-section views of an exemplary fiber-biasing curing fixture for use with an SC-based connector.
Figure 4B:
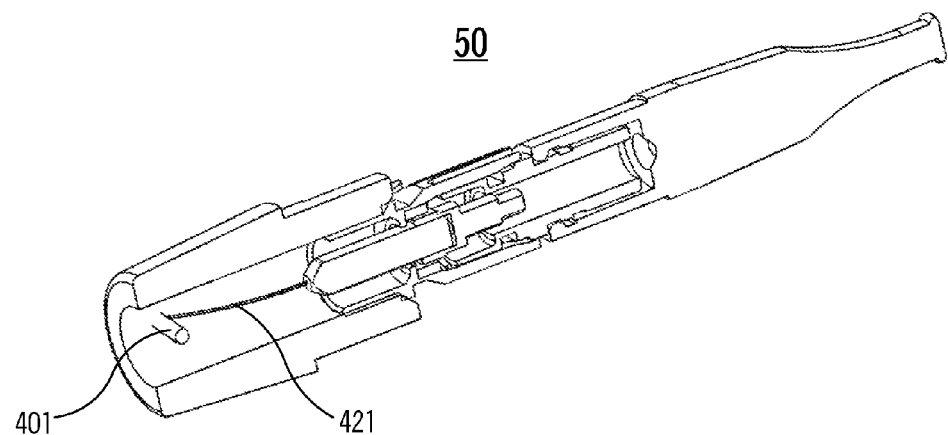

FIGS. 4A and 4B show, respectively, perspective and cross section views of an exemplary fiber-biasing curing fixture 40 and an SC-based (single-fiber) connector 42 mounted into the fixture 40.

The curing fixture 40 has a generally cylindrical shape with a hole extending from a first end to a second end. The first end of the fixture 40 is generally shaped like an SC-type socket. Thus, connector 42 can be plugged into fixture 40 generally in the same way that the connector 42 is plugged into a matching socket. The purpose of the hole extending through the fixture 40 is to provide a pathway for a length of fiber extending out of the tip of connector 42 when the connector 42 is plugged into the fixture 40.

As further shown in FIGS. 4A and 4B, a deflection pin 401 extends across the fixture hole and is positioned such that when the connector 42 is plugged into the fixture 40, the fiber 421 is urged against the deflection pin 401, causing the fiber within the connector tip to be urged in the direction of the desired applied bias. The position of the deflection pin within the fixture 40 can be adjusted to achieving the desired amount of deflection of the fiber end.

After the fiber and epoxy have been loaded into connector 42, connector 42 is seated in fixture 40, with the fiber end suitably positioned with respect to deflection pin 421. The connector 42 and fixture 40 are then placed into a curing oven to permanently fix the position of the fiber end within the connector 42.

Fixture for Use with LC-Based (Simplex) Connectors

Figure 5A:
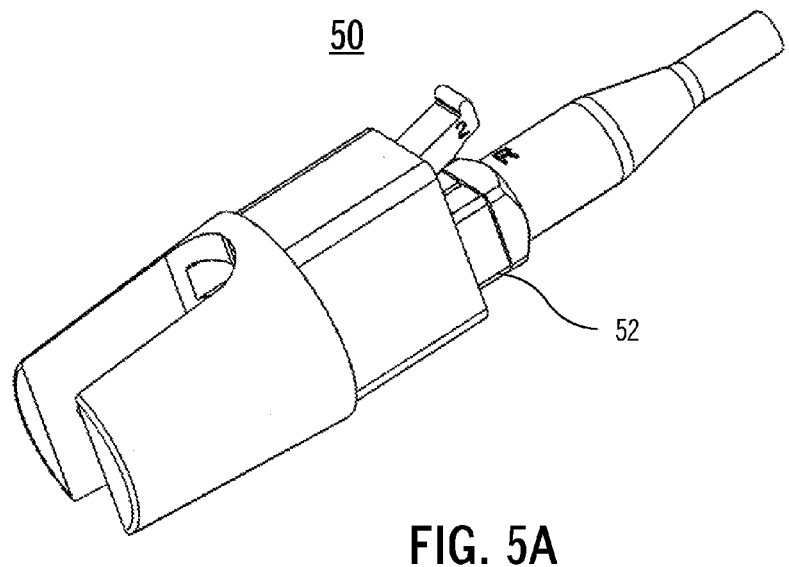
FIGS. 5A and 5B show, respectively, perspective and cross section views of an exemplary fiber-biasing curing fixture for use with an LC-based connector.
Figure 5B:
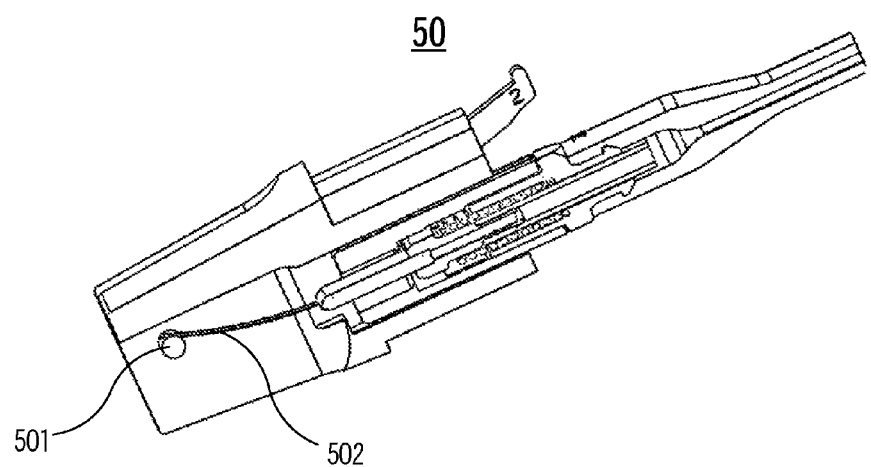

FIGS. 5A and 5B show, respectively, perspective and cross section views of an exemplary fiber-biasing curing fixture 50 and an LC-based (single-fiber) connector 52 mounted into the fixture 50.

The curing fixture 50 has a generally tubular configuration with a hole extending from a first end to a second end. The first end of the fixture 50 is generally shaped like an LC-type socket. Thus, connector 52 can be plugged into fixture 50 generally in the same way that the connector 52 is plugged into a matching socket. The purpose of the hole extending through the fixture 50 is to provide a pathway for a length of fiber extending out of the tip of connector 52 when the connector 52 is plugged into the fixture 50.

The second end of fixture 50 has a U-shaped cutout. A deflection pin 501 extends between the "legs" of the U-shaped cutout 502 and is positioned such that when the connector 52 is plugged into the fixture 50, the fiber 521 is urged against the deflection pin 501, causing the fiber within the connector tip to be urged in the direction of the desired applied bias. The position of the deflection pin within the fixture 50 can be adjusted to achieving the desired amount of deflection of the fiber end.

After the fiber and epoxy have been loaded into connector 52, connector 52 is seated in fixture 50, with the fiber end suitably positioned with respect to deflection pin 501. The connector 52 and fixture 50 are then placed into a curing oven to permanently fix the position of the fiber end within the connector 52.

Test Results

Figure 6:
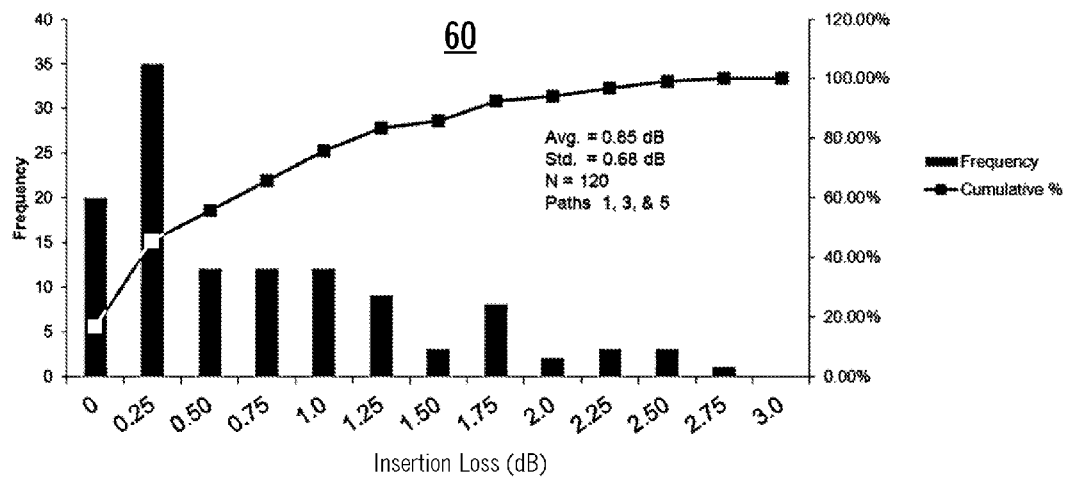
FIGS. 6 and 7 are a pair of graphs setting forth the results of product-to-product insertion loss testing.

The effectiveness of the MCF biasing technique has been demonstrated empirically. Two groups of SC APC jumper samples were produced using twisted single-mode MCF. The first group, Group A, was produced without biasing the twisted MCFs in the connector ferrules; the second group, Group B, was produced using the biasing technique. The results of product-to-product insertion loss testing are shown in FIG. 6 (graph 60) and FIG. 7 (graph 70).

Figure 7:
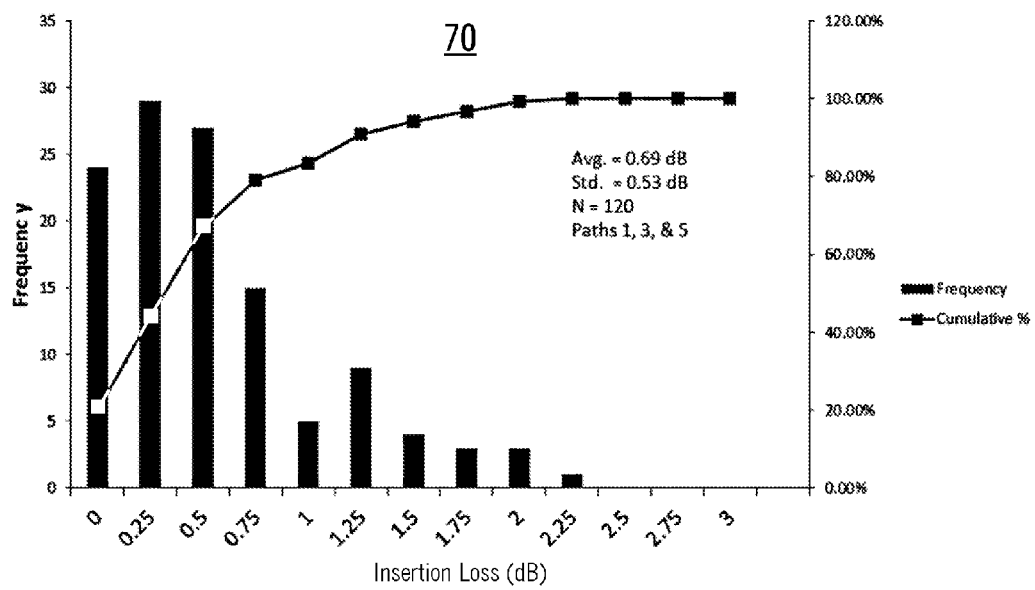

In each case, the insertion loss data represents the insertion losses measured on outer cores 1, 3, and 5, of the 7-core fiber (i.e. counting clockwise with Core 1 at the 12 o'clock position). As shown in FIG. 6, the unbiased samples provided a 0.85 dB average insertion loss, with a 0.68 dB standard deviation. However, the biased samples provided significant improvement with a 0.69 dB average insertion loss and 0.53 dB standard deviation, as shown in FIG. 7. Therefore, in this experiment, biasing the fibers resulted in a 20% reduction in the maximum loss that would be observed, assuming a 3-sigma limit.

Twisted MCFs—Polish-Induced Core Misalignment

Figure 8:
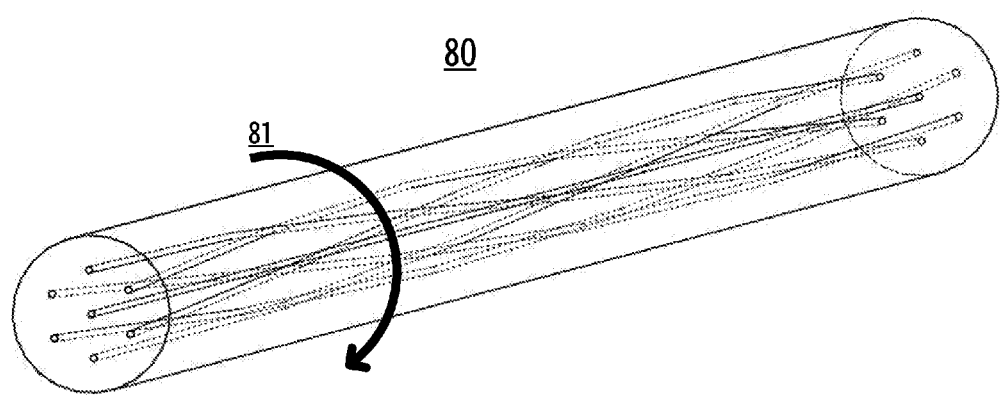
FIG. 8 is a diagram showing a perspective view of an exemplary twisted MCF.
Figure 9:
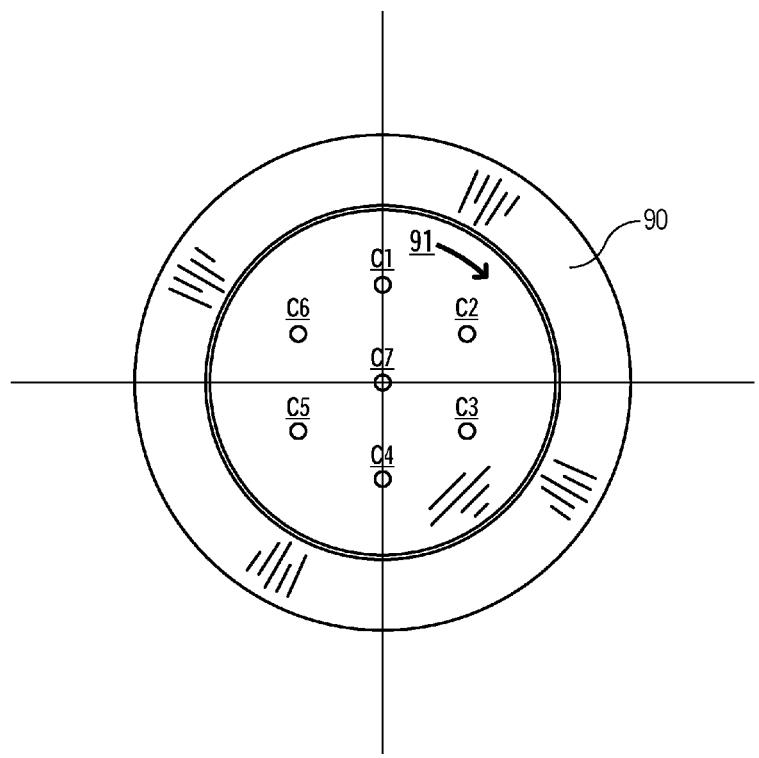
FIG. 9 is a diagram showing an end view of the twisted MCF installed into the tip of an exemplary angled-physical contact (APC) connector ferrule prior to angle-grinding.

A further aspect of the invention is directed to MCF termination techniques that are specifically intended to address polish-induced core misalignment in twisted MCFs. FIG. 8 shows a perspective diagram of a twisted MCF 80, and FIG. 9 is a diagram showing an end view of twisted MCF 80 after it has been installed into ferrule 90, prior to angle grinding. Fiber 80 is installed into a capillary extending to the tip of the ferrule 90.

The fiber endface is flush with the ferrule tip.

For the purposes of the present discussion, twisted MCF 80 is depicted as having seven cores, with the same cross-sectional core configuration as MCF 30, discussed above. For convenient reference, the cores of twisted MCF 80 are numbered using the same numbering scheme.

As discussed above, in a twisted MCF, the cores propagate down the length of the fiber in a helical configuration. In MCF 80, the helix has a clockwise orientation, indicated by arrow 81 in FIG. 8. Standard fiber termination and polishing procedures cause rotational misalignment of the outer cores C1-C6 in a clockwise direction, indicated by arrow 91 in FIG. 9. As material is polished away from the connector ferrule, the helical configuration of the cores causes them to migrate away from their initial position at the fiber endface.

According to as an aspect of the invention, this problem is addressed by adjusting the pre-polish angular alignment of an MCF relative to the connector housing in order to compensate for the core migration that occurs during polishing.

Figure 10A:
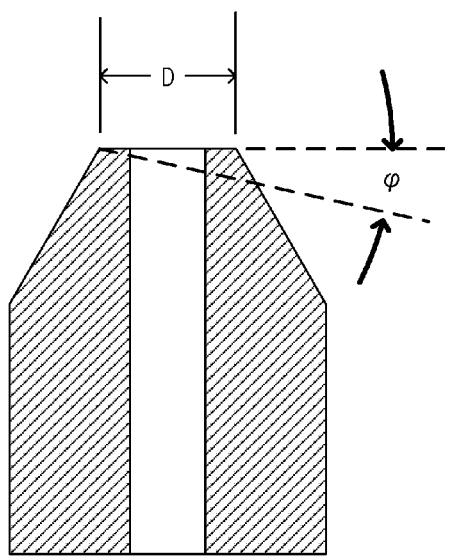
FIGS. 10A and 10B are diagrams showing cross-sectional views of the APC connector ferrule end before and after angle-grinding, respectively.
Figure 10B:
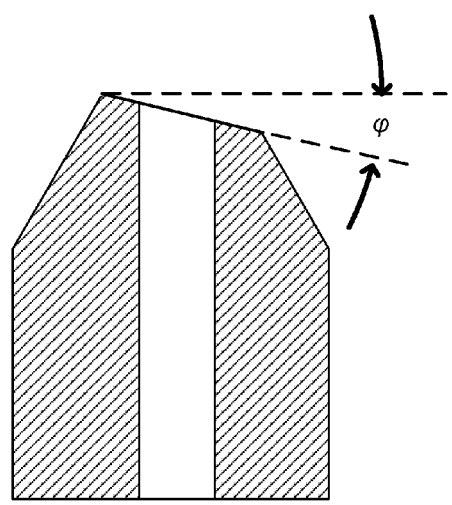

FIG. 10A shows a typical conical APC connector ferrule end, where D represents the initial pedestal diameter. FIG. 10B shows the connector ferrule end after the angle grinding step, where $\varphi$ represents the final end-face angle.

Figure 11A:
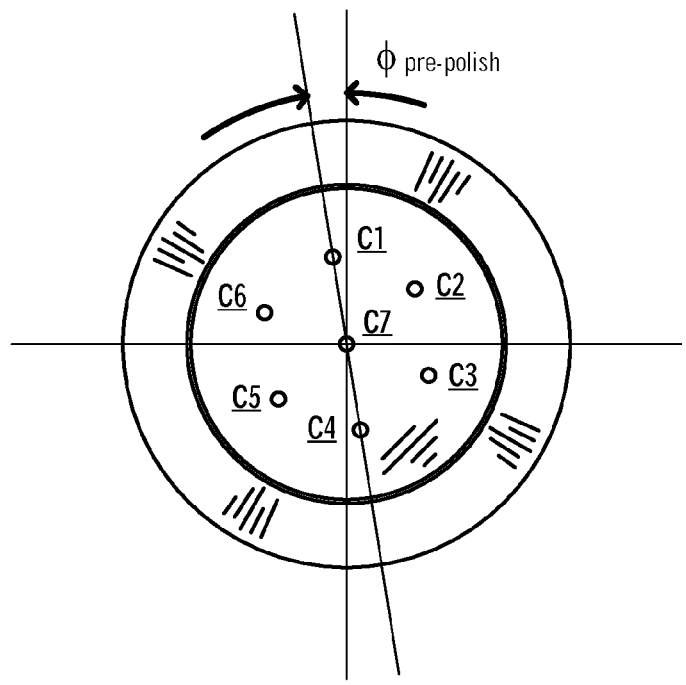
FIG. 11A is a diagram illustrating an aspect of the invention, according to which an adjustment has been made to the pre-polishing rotational alignment of the MCF.

In FIG. 11A, an adjustment has been made to the rotational alignment of the MCF in order to compensate for the subsequent rotational migration of the cores.

In accordance with a practice of the invention, an MCF with a clockwise helical core twist with a twist rate of T twists per meter is terminated in an APC connector. However, instead of initially aligning Core 1 in the 12 o'clock position, the core is aligned at least $\theta$ degrees counter-clockwise from the 12 o'clock position, where $\theta$ is governed by the following relationship:

$$\theta_{pre\text{-}polish} = 0.18 DT \tan \varphi$$

in which $\theta_{pre\text{-}polish}$ is the pre-polish core alignment angle, measured in degrees, relative to the 12 o'clock position; D is the pedestal diameter, measured in millimeters; T is the twist rate, measured in twists per meter; and $\varphi$ is the fiber endface angle, measured in degrees. (It is noted that the choice of units is arbitrary, and that the above equation may be suitably modified to accommodate the use of different units.)

This relationship provides insight into the minimum magnitude of the pre-polish angular orientation, $\theta_{pre\text{-}polish}$, since additional polishing is required to radius the end and perform the final polish to maximize return loss. The pre-polish angular orientation $\theta_{pre\text{-}polish}$ must also be adjusted to account for variations in the following: final polishing methods, connector spring forces, polishing fixture bore angle, pre-polish ferrule extension length, and core twist rate.

For a twisted-core fiber with a twist rate ranging from 47 to 78 twists per meter, terminated with an 8-degree angled connector, the pre-determined angular offset orientation of the select core will typically range from 0.7 to 3.0 degrees, depending on connector type.

Figure 11B:
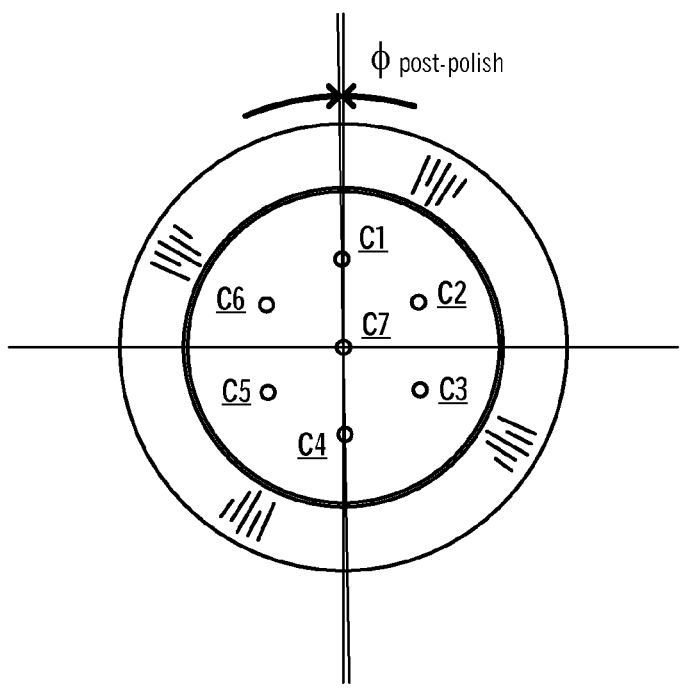
FIG. 11B is a diagram illustrating the core orientation of the MCF shown in FIG. 11A after polishing.

FIG. 11B is a diagram illustrating the core orientation of MCF 80 shown in FIG. 11A after polishing. Ideally, after polishing, the post-polish position of Core 1 will be at 12 o'clock (i.e., $\theta_{post\text{-}polish}=0$); however, in practice, the resulting angular orientation will typically be $-1.5° \leq \theta_{post\text{-}polish} \leq 1.5°$.

General Techniques

Figure 12A:
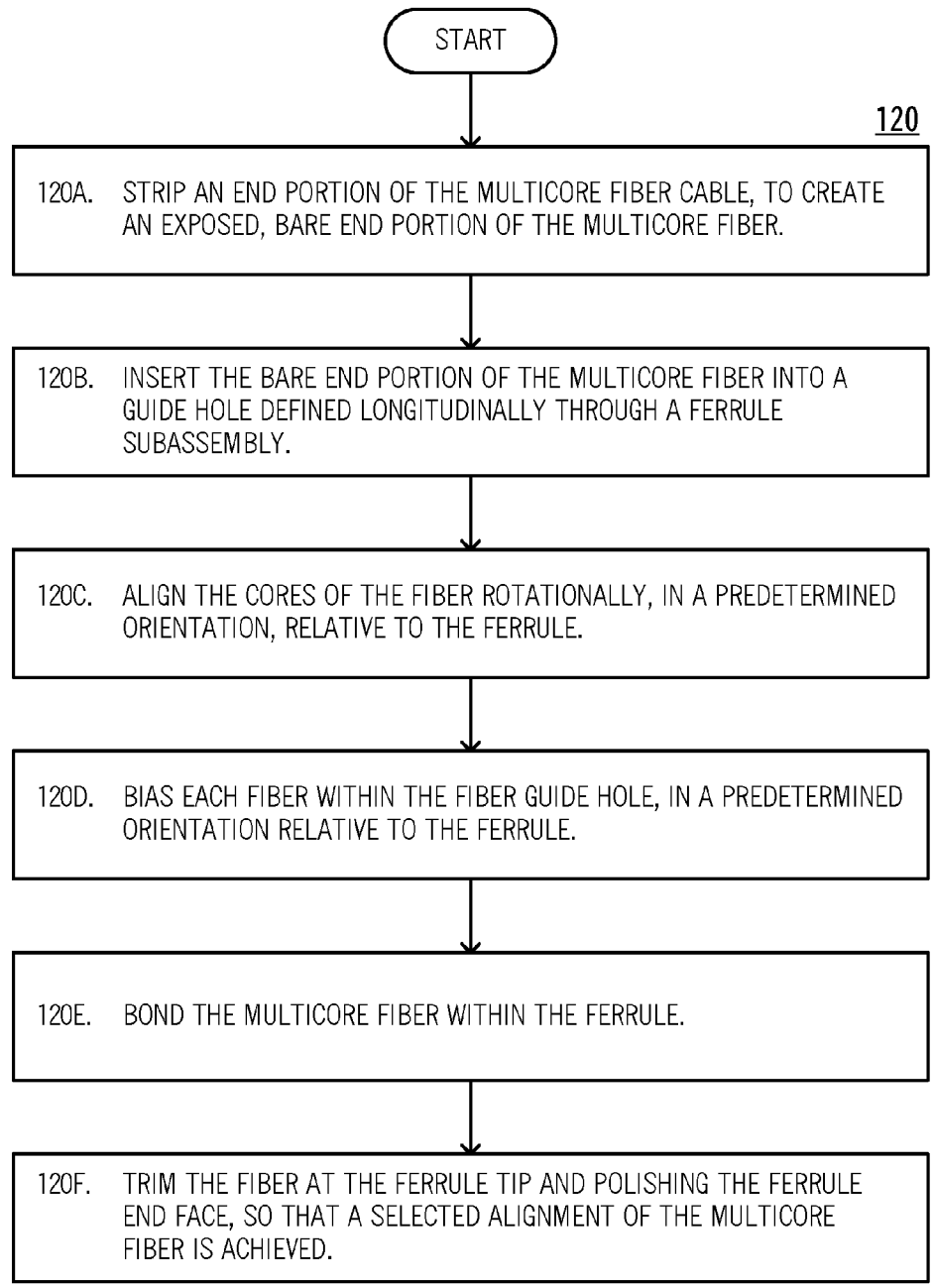
FIGS. 12A and 12B are flowcharts illustrating general techniques according to aspects of the invention.
Figure 12B:
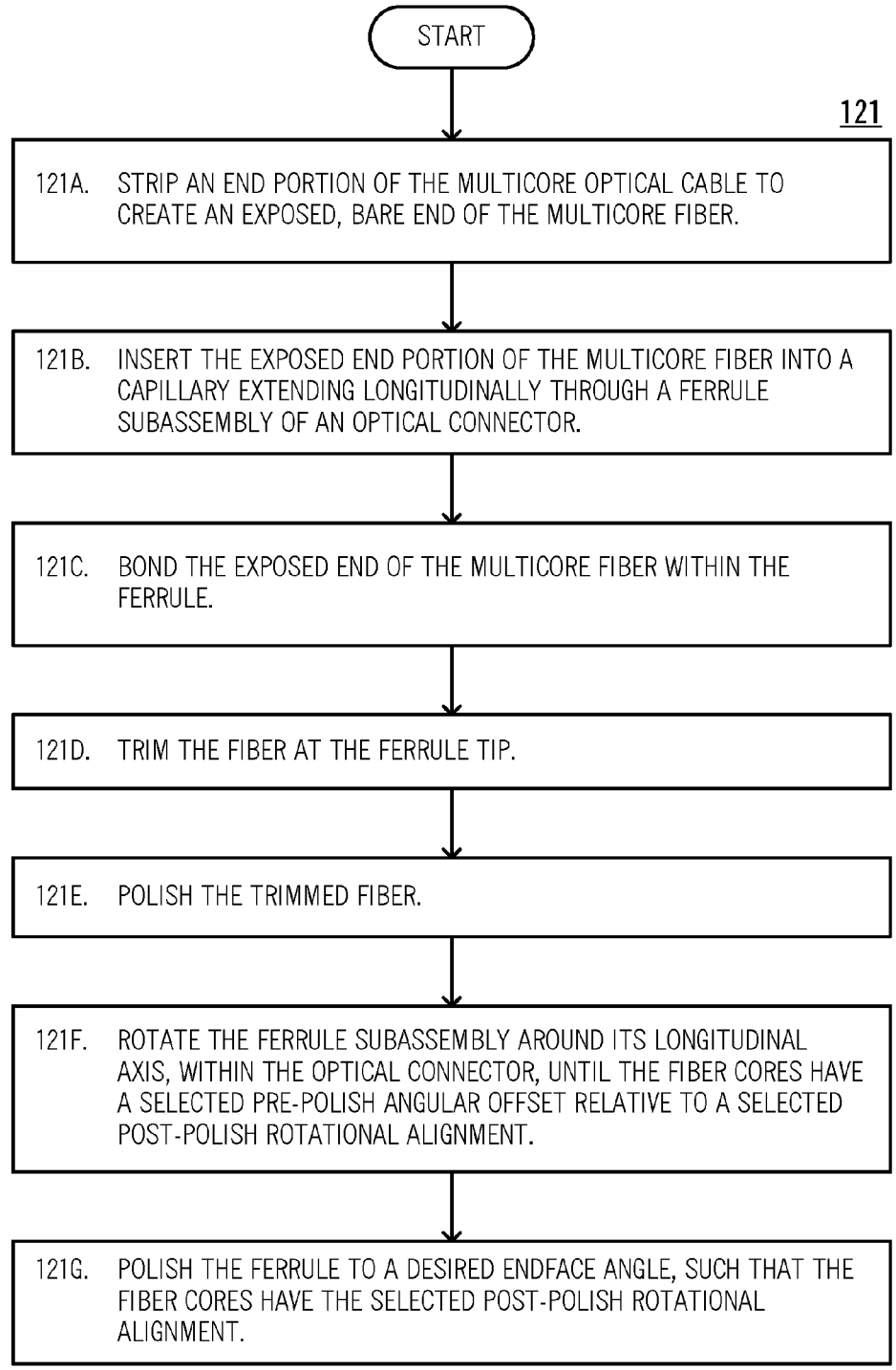

FIGS. 12A and 12B are flowcharts illustrating general techniques 120 and 121 according to aspects of the invention.

It should be noted that FIGS. 12A and 12B are intended to be exemplary, rather than limiting. The present invention may be practiced in a number of different ways, using different combinations of some or all of the elements set forth in these drawings, as well as combinations including elements not explicitly set forth in these drawings. Further, at least some of the enumerated steps may be performed in a different order, or contemporaneously.

FIG. 12A illustrates a technique 120 for aligning multicore optical fibers in a multicore optical fiber cable having a plurality of optical fiber cores, at least one end portion and a protective coating.

Technique 120 comprises the following steps:

120A: Strip an end portion of the multicore fiber cable, to create an exposed, bare end portion of the multicore fiber.

120B: Insert the bare end portion of the multicore fiber into a guide hole defined longitudinally through a ferrule subassembly.

120C: Align the cores of the fiber rotationally, in a predetermined orientation, relative to the ferrule.

120D: Bias each fiber within the fiber guide hole, in a predetermined orientation relative to the ferrule.

120E: Bond the multicore fiber within the ferrule. Adhesive, epoxy, or the like can be used in this step.

120F: Trim the fiber at the ferrule tip and polishing the ferrule end face, so that a selected alignment of the multicore fiber is achieved.

FIG. 12B illustrates a technique 121 for providing an aligned angled-physical contact (APC) connectorization for an optical cable containing a twisted core multicore optical fiber, the twisted core multicore optical fiber having a plurality of optical fiber cores arrayed substantially in a helical pattern.

Technique 121 comprises the following steps:

121A: Strip an end portion of the multicore optical cable to create an exposed, bare end of the multicore fiber.

121B: Insert the exposed end portion of the multicore fiber into a capillary extending longitudinally through a ferrule subassembly of an optical connector.

121C: Bond the exposed end of the multicore fiber within the ferrule. Adhesive, epoxy, or the like can be used in this step.

121D: Trim the fiber at the ferrule tip.

121E: Polish the trimmed fiber.

121F: Rotate the ferrule subassembly around its longitudinal axis, within the optical connector, until the fiber cores have a selected pre-polish angular offset relative to a selected post-polish rotational alignment.

121G: Polish the ferrule to a desired endface angle, such that the fiber cores have the selected post-polish rotational alignment.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A method of aligning multicore optical fibers in a multicore optical fiber cable having a plurality of optical fiber cores, at least one end portion and a protective coating, the method comprising:

stripping an end portion of the multicore fiber cable, to create an exposed, bare end portion of a multicore fiber, inserting the bare end portion of the multicore fiber into a guide hole defined longitudinally through a ferrule in a ferrule subassembly, such that the bare end portion of the multicore fiber extends out of a tip of the ferrule, aligning the cores of the fiber rotationally, in a predetermined orientation, relative to the ferrule, biasing each fiber within the fiber guide hole, in a predetermined orientation relative to the ferrule, bonding the multicore fiber within the ferrule, and trimming the fiber at the tip of the ferrule and polishing the ferrule end face, so that a selected alignment of the multicore fiber is achieved.

2. The method of claim 1, wherein a selected rotational alignment of the multicore fiber is achieved with respect to a second multicore fiber mounted into a mating optical connector.

3. The method of claim 1, wherein a selected rotational alignment of the multicore fiber is achieved with respect to an array of optical devices to which the multicore fiber is to be connected.

4. The method claim 1, wherein the multicore fiber has a circular profile.

5. The method of claim 1, wherein the multicore fiber has at least one flat side identifying a particular rotational orientation of the plurality of cores.

6. The method of claim 5, wherein the multicore fiber has a D-shaped profile.

7. The method of claim 5, wherein the multicore fiber has a double D-shaped profile.

8. The method of claim 5, wherein the multicore fiber has a polygonal profile.

9. The method of claim 1, wherein the step of biasing each fiber comprises biasing each fiber using a biasing fixture.

10. The method of claim 9, wherein the multicore fiber is aligned using a fixture in which a flat side of the fiber is urged against a fiber alignment surface so as to cause the multicore fiber to have a selected rotational alignment.

11. The method of claim 9, wherein the at least one multicore fiber is biased to one side of its respective guide hole using a fixture in which the fiber is urged to one side of its respective guide hole.

12. The method of claim 1, wherein the step of bonding the multicore fiber comprises bonding using adhesive or epoxy.

* * * * *